US008356046B2

(12) United States Patent
Hille-Doering et al.

(10) Patent No.: US 8,356,046 B2
(45) Date of Patent: Jan. 15, 2013

(54) CONTEXT-BASED USER INTERFACE, SEARCH, AND NAVIGATION

(75) Inventors: Reiner Hille-Doering, Karlsruhe (DE); Ronald Fischer, Wiesloch (DE)

(73) Assignee: SAP AG, Walldorf (DE)

( * ) Notice: Subject to any disclaimer, the term of this patent is extended or adjusted under 35 U.S.C. 154(b) by 23 days.

(21) Appl. No.: 12/875,639

(22) Filed: Sep. 3, 2010

(65) Prior Publication Data
US 2012/0059842 A1 Mar. 8, 2012

(51) Int. Cl.
*G06F 17/30* (2006.01)
(52) U.S. Cl. ........................................... 707/767
(58) Field of Classification Search ........... 707/765–768
See application file for complete search history.

(56) References Cited

U.S. PATENT DOCUMENTS

| | | | |
|---|---|---|---|
| 2003/0065986 A1* | 4/2003 | Fraenkel et al. | ................ 714/47 |
| 2006/0075120 A1 | 4/2006 | Smit | |
| 2007/0061701 A1 | 3/2007 | Thieberger et al. | |
| 2007/0226168 A1 | 9/2007 | Mukundan et al. | |
| 2009/0070712 A1 | 3/2009 | Schubert et al. | |

OTHER PUBLICATIONS

Smart Tags Overview—msdn [online] "Visual Studio 2010 Smart Tags Overview" [retrieved from the Internet Sep. 1, 2010] <URL: http://msdn.microsoft.com/en-us/library/ms178786.aspx>.
Extended European Search Report issued in European Application No. 11007145.3 on Jan. 25, 2012; 7 pages.

* cited by examiner

*Primary Examiner* — Thu-Nguyet Le
(74) *Attorney, Agent, or Firm* — Fish & Richardson P.C.

(57) ABSTRACT

The present disclosure involves systems, software, and computer implemented methods for providing context-based user interfaces, searches, and navigation in business processes. One process includes operations for identifying a data field on an electronic page to be populated by a user for a business process and a data object associated with the business process. A particular data object field in the data object is selected for additional searching, and a suggested entry for populating the data field is determined based on a search for additional information associated with the business process using the particular data object field and a particular type of the data object.

22 Claims, 4 Drawing Sheets

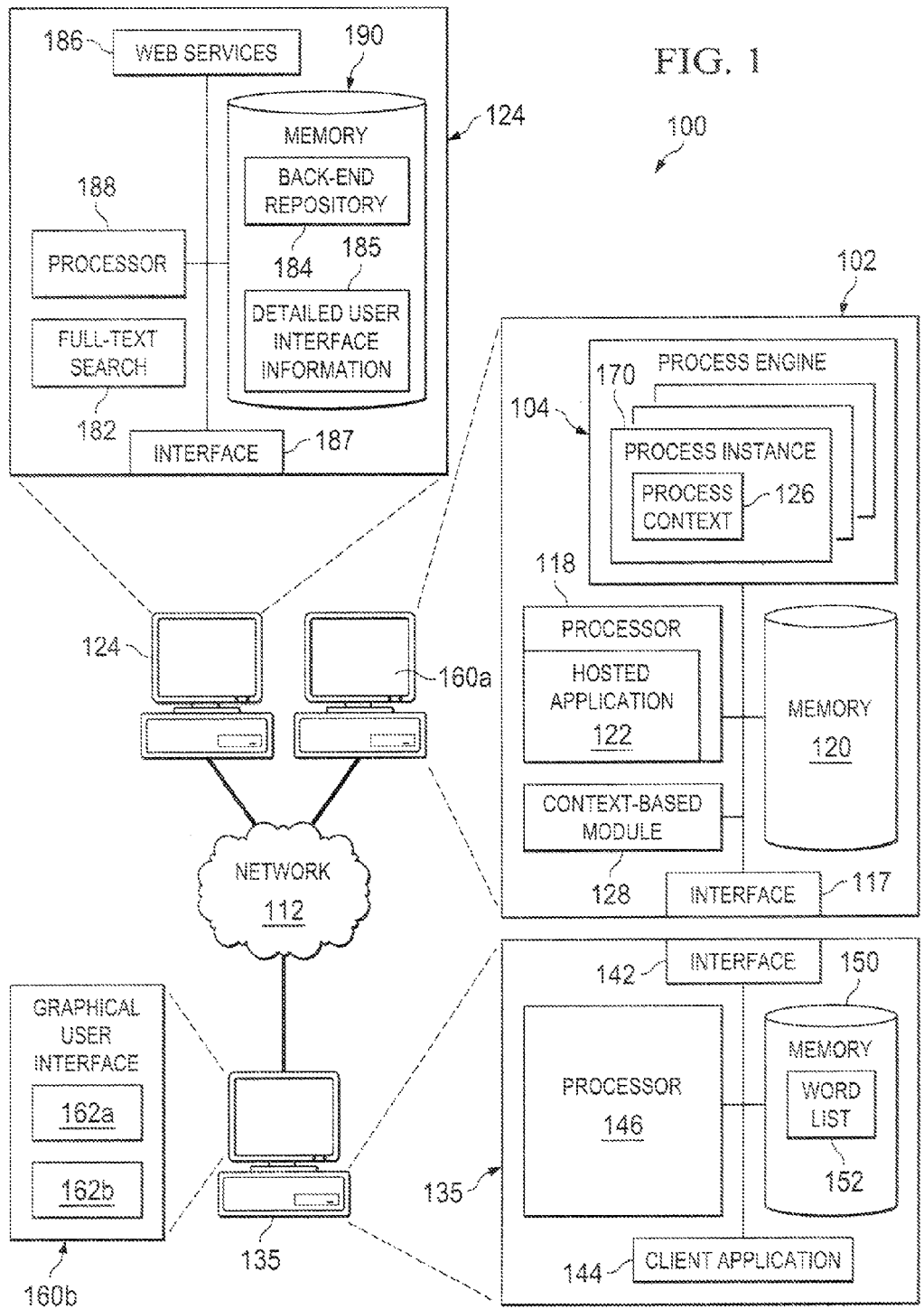

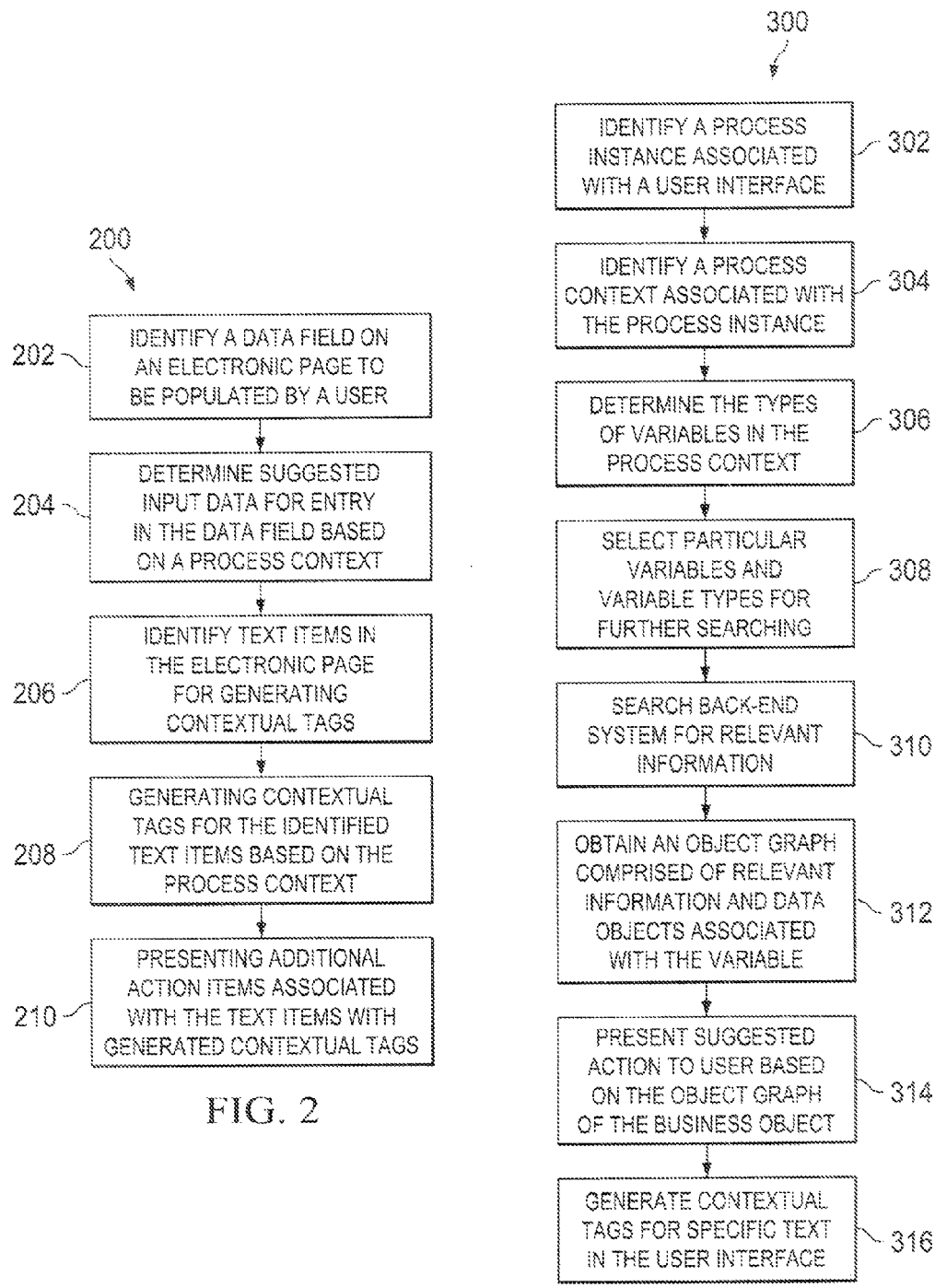

| FIELD NAME | FIELD TYPE | FIELD VALUE |
|---|---|---|
| employeeID 402a | userID 402b | d055555 402c |
| employeeName 404a | string 404b | Administrator 404c |
| absenseType 406a | AbsenseType 406b | Vacation 406c |
| From 408a | Date 408b | 408c |
| To 410a | Date 410b | 410c |
| UserDays 412a | integer 412b | 412c |
| approverID 414a | userID 414b | d023588 414c |

CONTEXT-BASED USER INTERFACE, SEARCH, AND NAVIGATION

TECHNICAL FIELD

The present disclosure relates to software, computer systems, and computer implemented methods for providing context-based user interfaces, searches, and navigation in business processes.

BACKGROUND

Applications, web pages, or electronic forms may have input fields that allow a user to enter information for processing. Users of business applications, for example, may need to enter information to complete or facilitate a particular step of a business process being executed by the business application. In connection with the business process, the user may also want additional information or access to external resources while performing tasks related to the business process. The external resources may be obtained directly by the user through online searching or through other methods external to the business application. In some instances, however, the business application or the business process may be an ad hoc solution for a specific environment or scenario, and the types of information that the user needs for a particular task associated with the business process may not be readily accessible through typical searching methods. Even if the user can obtain relevant information through online searching, for example, the information may not be suitable for the particular context of the current business process associated with the user. Also, identifying relevant information for a particular business process through searching methods external to the process may be an inefficient application of resources. For example, a user may benefit from information specific to a particular business or product while the user performs tasks associated with a business process, but the information may not be available through typical searching methods or the user may not even be aware of the types of information that may be beneficial for a particular step of the business process.

Data fields available for user input in a business application, web page, or electronic form may be presented through a user interface. The user interface may include various data fields and text. The data fields and text within the user interface may be used by an application to identify suggestions for input values or additional actions available to the user and associated with a particular data field or text. Particular text characters or data fields may be tagged, providing suggested links or action items associated with the text. The tagged fields or characters, however, may not be associated with a particular context of the user or may only be applicable to words or phrases that are generally recognized. Further, the options available to the user through the user interface may not give the user guidance in finding related information or related process steps associated with a business process. In other words, the user interface may not sufficiently meet the user's need within a particular business context.

SUMMARY

The present disclosure provides techniques for providing context-based user interfaces, searches, and navigation in business processes. A computer program product is encoded on a tangible storage medium, where the product comprises computer readable instructions for causing one or more processors to perform operations. These operations can include identifying a data field on an electronic page to be populated by a user for a business process and a data object associated with the business process. A particular data object field in the data object is selected for additional searching, and a suggested entry for populating the data field is determined based on a search for additional information associated with the business process using the particular data object field and a particular type of the data object.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 illustrates an example environment implementing various features of context-based user interfaces, searches, and navigation in business processes;

FIG. 2 is a flow chart of an example process for providing suggested information to a user performing tasks associated with a business process using an appropriate system, such as the system described in FIG. 1;

FIG. 3 is a flow chart of an example process for generating suggested context-based options using an appropriate system, such as the system described in FIG. 1;

FIG. 4 is an example model of a data object associated with a business process within an appropriate system, such as the system described in FIG. 1.

DETAILED DESCRIPTION

Figure 5:
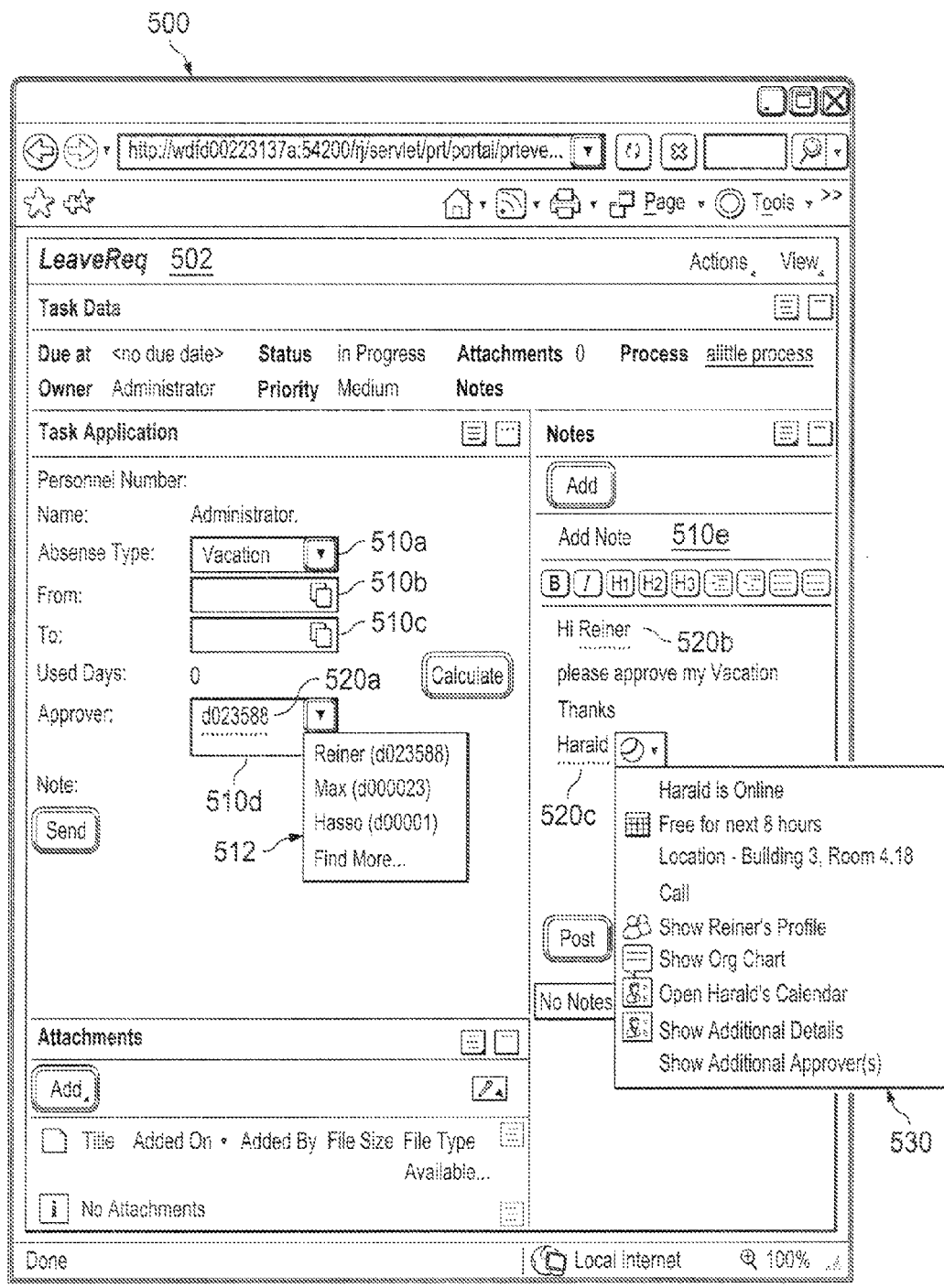
FIG. 5 is an example screenshot of a context-based user interface with automated searching using an appropriate system, such as the system described in FIG. 1.

This disclosure generally describes computer systems, software, and computer implemented methods for providing context-based user interfaces, searches, and navigation in business processes. Business processes, especially if executed as extension processes to existing processes running in an enterprise resource planning (ERP) system, may have a process context that can be used for intelligent searching, navigation, and automatic creation of links. For example, a list of suggested actions may be automatically generated for certain terms within a task execution user interface. Input data fields, text entered by a user, and static text or other portions of a user interface may be enriched with automatic links. Static text or content of an input field can be highlighted with links that allow context based navigation to appropriate user interfaces. Automatic or user search functions can also be improved to return applicable search results based on the context of a current business process.

For example, a user interface may provide a visual representation of data fields for users to input data as well as character strings and text for displaying information to the user. The user, however, may need supplementary information not readily apparent from the data fields or text of the user interface in order to input data in a particular data field or to complete an electronic form. Additional options for helping the user understand or process the information presented in the user interface may also be available to the user. The additional information and options may be provided to the user through the user interface via suggested input values for a particular data field, suggested action items available to a user, or links for connecting the user to a beneficial process associated with the user's current context. As a result, the user interface may be enriched in accordance with the process context of a particular process instance involving the user.

The enrichment of the user interface is implemented generically based on a semantic link between the structure of the process context associated with a process instance and the additional information and suggested options presented to the user. In particular, each business process instance is associated with a process context containing different variables defining the process instance. Each variable in the process context may correspond to a particular variable type or "business object type." The variable type may inherently include semantic information defining the relationships associated with each variable. Accordingly, the semantic information obtained from certain variable types as well as the values of certain data fields are used to search an ERP system to search for additional information or options that may assist a user interacting with the process instance. The search results may be used to generate additional options for a user, such as a word list to add contextual tags to data fields in the user interface or suggested links for certain tasks in the business process.

One potential benefit of the context-based user interface, searching, and navigation of the present disclosure is that a user is provided with an environment closely tailored to the user's specific need in a particular business environment. Users of business applications may perform tasks associated with a business process using the business applications and may need guidance or helpful information while performing the tasks. The information that a user may need may not be readily accessible or apparent to the user. For example, the business process may be associated with a particular business organization, and traditional searching methods may not provide the user with the information necessary to complete a task in the business process. Even if the user has access to resources to obtain additional information or to perform various tasks, the user may benefit from being presented with suggested information or options that may increase the user's efficiency in performing tasks of the business process. For example, as the user inputs data in the user interface of a business application, the context-based environment can perform automatic searching in the background to provide suggestions to the user so that the user can continue entering data in the user interface without interruption.

The present disclosure describes a context-based environment that identifies information, tools, links, or other suggested options that are specifically tailored to a particular process context and that a user may likely need for completing tasks of a business process. The suggestions and information can be made readily available to the user through a user interface of a business application to increase the efficiency of the user and identify potential solutions that are not readily apparent. Further, the context-based environment can adapt the suggested information and automated searching to the particular usage patterns of a specific user or of a plurality of users based on a history of previous actions or a success rate of particular suggestions presented to the user.

Turning to the illustrated example, FIG. 1 illustrates an example environment 100 for providing context-based user interfaces, searches, and navigation in business processes. The illustrated environment 100 includes or is communicably coupled with server 102 and one or more clients 135, at least some of which communicate across network 112. The environment 100 also supports a system capable of automatically identifying semantic information associated with a process context of a business process and using the semantic information to identify and present, through a user interface of a business application, relevant information or suggested options specifically tailored to the user and the context of the business process.

In general, server 102 is any server that stores one or more hosted applications 122, where at least a portion of the hosted applications 122 are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by the clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications 144 or business applications associated with the clients 135 of environment 100 and responding to the received requests by processing said requests in the associated hosted application 122, and sending the appropriate response from the hosted application 122 back to the requesting client application 144. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, one or more hosted applications 122, and a process engine 104. The interface 117 is used by the server 102 for communicating with other systems in a client-server or other distributed environment (including within environment 100) connected to the network 112 (e.g., client 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 102 may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to select from a list of suggested entries for input into a data field displayed in GUI 160a. GUI 160a may also display suggestions of possible actions or links to processes that may be beneficial to a user. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and client 135), as well as with any other local or remote computer, such as additional clients, servers, or other devices communicably coupled to network 112 but not illustrated in FIG. 1. The network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 can also execute a process engine 104 that serves as a runtime engine for business processes executed in connection with hosted application 122 or client application 144 and provide an environment in which users can develop and deploy business processes. The process engine 104 can provide development tools, interfaces, modules, services and metadata definitions that enable hosted application 122 or client application 144 to be executed in association with a particular business process. In particular, the process engine 104 may execute business processes defined by or modeled in Business Process Execution Language (BPEL), Business Process Modeling Notation (BPMN), or other mechanisms for defining business processes. Each instance of a business process executed in connection with process engine 104 is a process instance 170 of the process engine 104. Further, the process engine 104 can maintain a plurality of process definitions for the business processes executed by the process engine 104. The process definitions include variables, models, and components that define the structure of certain business processes. In other words, each process definition may represent a process model or template upon which one or more process instances 170 can be based, and process instances 170 associated with a particular process definition may share certain variables or components. Each process instance 170 is also associated with a process context 126. In general, each process context 126 is a collection of variables associated with a particular process instance 170 that defines various parameters of the process instance 170. The variables can include data objects that contain fields having values of different parameters of the process instance 170. Accordingly, the terms "variable" and "data object" may be used interchangeably as appropriate without departing from the scope of this disclosure.

Further, processor 118 can also execute a context-based module 128 that may be any application, program, function, module, process, runtime engine, or other software that may be used for generating additional information or options for presentation to a user in connection with the business process. In particular, the context-based module 128 identifies information, tools, links, or other suggested options that are specifically tailored to a particular process context 126 and that a user may likely need for completing tasks of the business process. In other words, the process context 126 may be used by the context-based module 128 to generate additional guidance for a user for completing the business process. The context-based module 128 utilizes a current state of the process context 126 associated with a particular process instance 170 to enrich a user interface with additional options, suggestions, and information to assist a user interacting with the particular process instance 170.

In certain implementations, the context-based module 128 implements the enrichment of the user interface generically by identifying a semantic link between the structure of the process context 126 and the additional options and information. For example, the variables contained within a particular process context 126 may be created from web services called by the process instance 170 associated with the process context 126. The web services may be maintained by a back-end system 124 accessible to the server 102 through network 112. In some instances, the variables in the process context 126 originate from an enterprise service of an underlying ERP system and a corresponding XML (Extensible Markup Language) schema. Accordingly, these variables may be associated with a particular variable type such as a business object type or an XML namespace. Further, each variable type provides some semantic information about how the variable is defined with respect to a particular process instance 170. For example, enterprise services may implement a Core Component Technical Specification (CCTS) data modeling system that contains information concerning the semantic meaning of particular variable types. Thus, the context-based module 128 can then use the semantic information associated with the variables to identify a particular variable to use for searching for additional options for a particular process instance.

The context-based module 128 uses the namespace of a variable as well as an actual value of the variable to search for additional information or options that may assist a user interacting with the process instance 170. The context-based module 128 may perform a full-text search of a back-end repository 184 of the back-end system 124 using the namespace of a variable as well as the value of the variable, for example, to identify the additional information or options to present to the user. In some instances, the context-based module 128 can also identify certain fields within a particular variable to be used for searching the back-end repository 184. The fields in a variable may also be associated with a data type, and can be identified for searching based on the semantic information associated with certain data types. Further, some variables can be structured with multiple fields in nested layers, and any combination of different fields from different layers can be identified for searching. The search results may then be used to generate a word list 152 to create contextual tags to apply to data fields in the user interface. Additionally, the search results may be used to generate and present corresponding links to additional information. One example of an implementation of the context-based module 128 is described in further detail below in connection with FIG. 3.

The suggestions and information can be made readily available to the user through a user interface of a business application such as through GUI 160b of client 135 to increase the efficiency of the user and identify potential solutions that are not readily apparent. Further, the context-based module 128 can adapt the suggested information and automated searching to the particular usage patterns of a specific user or of a plurality of users based on a history of previous actions or a success rate of particular suggestions presented to the user. The history of responses to suggested options may be stored in memory 120. In some implementations, the word list 152 generated from the search of the back-end system 124 may be stored in memory 150 on a client computer 135 or in memory 120 at server 102. The word list 152 can be used to select relevant text displayed in GUI 160b for further searching. The word list 152 includes related words that are known to provide additional information in a particular process context. The word list 152 may be updated with additional information as users respond to suggested options displayed to the users. Any appropriate mechanism may be used for updating the word list 152 such as, for example, asynchronous JavaScript and XML (AJAX) web development techniques.

The process engine 104 may be separate from hosted application 122, while in other instances, the process engine 104 may be embedded within or part of a particular one or more hosted applications. In some instances, hosted application 122 may be communicably coupled to the process engine 104, allowing hosted application 122 to access and take advantage of the functionality provided by the process engine 104. Through analysis of previously generated suggested options and the frequency or selection rate of particular options, the context-based module 128 can identify potential suggested options or additional information that may have a greater chance or probability of selection by a user. The functionality provided by the context-based module 128 can include providing user interface support for generating drop-down menus that list suggested options or generating "You can also . . . " links for frequently selected options, for example.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122. Still further, memory 120 may include any other appropriate data, such as VPN applications, firmware logs and policies, HTML files, data classes or object interfaces, unillustrated software applications or sub-systems, firewall policies, a security or access log, print or other reporting files, as well as others.

As depicted in FIG. 1, environment 100 also includes a back-end system 124. Generally, the back-end system 124 is an electronic computing device operable to receive, transmit, process, store, or manage data and information associated with the environment 100 and is operable to connect to or communicate with at least the server 102 and/or one or more clients 135 via the network 112 using a wireline or wireless connection. In certain implementations, the back-end system 124 is an enterprise resource planning (ERP) system used to manage resources and operations and facilitate the flow of information in a business environment. As illustrated in FIG. 1, the back-end system 124 includes a processor 188, an interface 187, and a memory 190. The back-end system 124 hosts a variety of services available to business processes executed externally, such as business processes executed by a process engine 104 at server 102. For example, the back-end system 124 provides web services 186 accessible to external business processes as well as a full-text search 182 of data stored in a back-end repository 184 within memory 190 at the back-end system 124. In particular, the back-end repository 184 may store data associated with business processes executed by the process engine 104 of server 102. The data associated with the business processes can be user-defined or automatically generated metadata or other data describing various applications, variables, elements, organizations, products, or other entities related to a business process as described in the present disclosure. Although the back-end system 124 is depicted as a single server or computing device in FIG. 1, the back-end system 124 may also be distributed across a plurality of hardware and software units.

In some instances, the back-end repository 184 may be accessible to the context-based module 128, and an automatic full-text search function 182 may be invoked by context-based module 128 to search the back-end repository 184 for any information associated with a particular user, business process, or user interface element that may be useful for identifying suggested options to present to the user. For example, the context-based module 128 can perform a full-text search of the back-end repository 184 using semantic information associated with a particular variable type as well as values of certain fields within the variable to identify additional information or options that may assist a user interacting with a particular process instance 170. The data in the back-end repository 184 may also include data associated with a history of suggested options presented to a particular user or a plurality of users as well as statistical data reflecting actions performed in response to presentation of suggested options. Further, memory 190 may also store detailed user interface information 185, which may be obtained by the context-based module 128 to generate suggested links to a user interacting with a particular process instance 170.

The illustrated environment of FIG. 1 also includes one or more clients 135. Each client 135 may be any computing device operable to connect to or communicate with at least the server 102 and/or via the network 112 using a wireline or wireless connection. Further, as illustrated in FIG. 1, client 135 includes a processor 146, an interface 142, a graphical user interface (GUI) 160b, a client application 144, and a memory 150. The GUI 160b is operable to provide a user-friendly presentation of business data provided by or communicated within the system. The GUI 160b may comprise a plurality of interactive elements that present suggested options or that allow a user to enter data for completing business processes. The interactive elements can include drop down menus or data fields 162a-b, for example.

In general, client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes one client 135, alternative implementations of environment 100 may include multiple clients communicably coupled to the server 102, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160*b*. Both the input and output device may include fixed or removable storage media such as a magnetic storage media, CD-ROM, or other suitable media to both receive input from and provide output to users of client 135 through the display, namely, the GUI 160*b*.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user directly utilizing GUI 160*a*. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

FIG. 2 is a flow chart illustrating a process 200 of providing context-based user interfaces, searches, and navigation in business processes. First, a data field on an electronic page to be populated by a user can be identified at 202. The electronic page is presented to the user as part of a process instance involving the user. Then, suggested entries for input into the data field based on a process context of the process instance may be determined at 204. The process context may be determined based on, for example, the data fields presented by the process instance, prior actions of the user, information associated with the user, a profile of the user stored in a database, or the type of information entered by the user or associated with the data field. The suggested entries are specifically tailored to the particular process context of the business process being executed and to the particular user. In some implementations, specific text in the electronic page may also be selected for application of contextual tags at 206. The contextual tags may be data structures that contain relevant information associated with particular words. The information contained in the contextual tags may be links to external sources for more information that may benefit the user, relevant information identified from automated or previous search results, links to other applications for performing auxiliary tasks in connection with the current business process, or other types of contextual links or data that the user may find beneficial to a particular business process. Contextual tags for the identified text items can also be generated based on the process context of the process instance at 208. Additionally, the contextual tags can be generated based on at least one suggested entry for input into a data field. For example, the suggested input data identified at 204 may be used to select relevant text in the user interface for generating contextual tags. Finally, the additional action items associated with the text and generated contextual tags may be presented to the user at 210. The suggested entries and information in the contextual tags presented to the user may help the user efficiently identify additional information or potential solutions while performing a task associated with a business process.

FIG. 3 is a detailed flow chart of a process 300 for providing context-based user interfaces, searches, and navigation to facilitate business processes. First, a business process associated with a user interface 160*b* is identified at 302. In some implementations, business processes may comprise one or more actions performed using a business application 144. The actions may be particular tasks performed in association with a business organization. In certain instances, the tasks may be divided into segments or consist of multiple steps executed in sequence. A user of business application 144 may initiate a particular business process instance in the business application 144, and a particular user interface arrangement may be presented to the user during a step of the process instance. A context-based module 128 may determine that the process instance being executed is associated with a process context 126 containing variables representing relevant values associated with the process instance. In general, the process context 126 is a collection of variables associated with a particular process instance that may be used by the context-based module 128 to generate additional guidance for a user for executing the process instance. Further, some of the variables in the process context 126 may be directly linked to certain data fields 162 displayed in the user interface 160*b*. Accordingly, the context-based module 128 may identify the particular process instance through recognition of particular data fields 162 in the user interface 160 that are bound to a particular process instance.

Different variables within the same process context 126 may represent values of different variable types, and the variables may be identified based on the business object type of each variable. The variable types, such as the types of variables used in a Core Component Technical Specification (CCTS) data modeling system, can be used along with the values contained in the variables to derive information about the process instance. For example, a process context 126 may include a variable representing an employee ID. The employee ID variable may be associated with a "userID" variable type. Accordingly, based on the userID variable type and the semantic information associated with the variable type obtained from a CCTS system, a context-based module 128 may determine that the employee ID variable is associated with a person. As illustrated in the example described below in connection with FIGS. 4 and 5, a process context 126 may include variables of different types, and the variable types can be used to derive information for facilitating a business process. As described in further detail below in connection with FIG. 4, the process context 126 can also be associated with or bound to a particular data structure comprised of various fields, with each field representing different values in the process context 126.

A process context 126 associated with the process instance is identified at 304. In some implementations, the process instance is modeled or executed in connection with an enterprise service system, and an enterprise web service description file can be imported to obtain the variable types found in a particular process context 126. The process context 126 can then be based interactively or automatically on the variable types defined in the enterprise web service description file. The variables in the process context 126 include values that are associated with the corresponding process instance such as values needed to fully execute the process instance. For example, a process context 126 for completing a purchase order may include variables such as a purchase order ID, an employee ID of the employee handling the purchase order, or a product ID of the purchased product. Generally, business processes associated with a common business organization or application may have standardized variable types as needed within the organization or application.

After the process context 126 is identified, the types of variables within the process context 126 are determined at 306. The variable types can be determined by the context-based module 128 through analysis of the names of the variables or other methods. In some implementations, information associated with variable types may be stored in a type repository, and the context-based module 128 may search the type repository for data associated with each variable type. The variable types may also include inherent semantic information reflecting the meaning of the variable or logical relationships associated with the variable. This semantic information can be obtained from a CCTS data modeling system that contains information concerning the semantic meaning of particular variable types, for example. Next, particular variable types as well as the values contained in data fields in the variables within the process context 126 can be selected for further searching at 308. The context-based module 128 can select particular values in the variables for further searching based on the semantic information associated with different variable types or any other suitable criteria. For example, based on the semantic information of certain variable types, some variables or fields may be more likely to yield useful search results and are more likely to be selected for additional searching. Variables may also be selected based on their relative importance in a particular business process. Further, in certain implementations, variables are selected based on the likelihood that the user will need guidance for particular steps in the process instance. The possibility that a particular user will need guidance for specific steps in the process instance can be determined based on, for example, the user's preferences, statistical data of user-specific behavior or general usage patterns associated with certain business processes, the inter-dependencies of known and unknown variables in a particular process context 126, or any other metric for predicting the need for automated guidance during execution of a process instance. Moreover, certain fields within a particular variable can also be used for searching the back-end repository 184. The fields in a variable may also be associated with a data type, and can be identified for searching based on the semantic information associated with certain data types.

The selected variables and corresponding variable types are then used to search for relevant information associated with the process instance at 310. In some implementations, the database to be searched may be a repository 184 in a back-end system 124. The known values of certain variables in the process context 126 as well as the variable types associated with those variables can be used as search terms to obtain relevant search results. For example, each variable may be associated with a particular variable type such as a business object type or an XML namespace. The XML namespace of a variable and the value of the variable may be used in a full-text search of the back-end repository 184 for additional options. A statistical filtering process may be performed on the search results to identify particularly relevant information for suggesting options to the user. For example, the context-based module 128 may access stored information related to the user, which may include a history of the user's selections of previously presented suggestions, the user's previous entries in certain data fields 162, and the general success rate of particular suggestions. This statistical information related to the user can be used to narrow the search results and identify relevant data. In particular, the desired search results can be any type of information that may provide some assistance to determining suggested entries or action items for a particular process instance. For example, during processing of a purchase order, a known variable selected from the process context 126, such as an employee ID, may be used to search a back-end repository 184 for relevant information for generating suggested approvers of the purchase order as required by the process instance. The search of the back-end repository 184 may find an organizational chart associated with the employee. The user's supervisors can be determined from the organizational chart, which may be beneficial for identifying suggestions for completing the purchase order because the user's supervisors are potential approvers of the purchase order.

In particular, the context-based module 128 may obtain or generate an object graph at 312 based on the results of the search, which may include an object graph associated with the process context 126. An object graph is a logical representation of the connections and dependencies between data objects or variables associated with a process instance. For example, an object graph generated from a search for information related to a particular employee may include data objects related to the employee's immediate supervisors, business processes associated with the employee, or the most recent client contacts of the employee. The relationship between the data objects associated with these items may also be included in the object graph.

The object graph may be used with any other relevant information obtained from the search result to generate and present suggested options to the user at 314 to facilitate a pending business process. In some instances, the suggested options are suggested entries for input into a data field 162 or a list of suggested actions that the user can perform in association with the content of the data field 162. For example, a marketing business process may require a user to enter potential recipients of marketing material into data fields 162 in a user interface 160*b*. Using the automatic searching performed by the context-based module 128 as described above, suggested recipients of marketing material may be presented to the user through the user interface 160*b*. The suggested recipients may include, for example, recent client contacts of the user that have had prior transactions associated with the subject matter of the marketing material. The context-based module 128 may additionally present suggested actions related to the data fields 162 such as allowing a user to access resources that may help identify potential recipients of marketing material. In other words, based on the variables and variable types in the process context of a particular process instance, the context-based module 128 may identify potentially relevant information for suggesting options to a user to assist the user in completing a business process.

As the context-based module 128 performs automated searching related to particular variables associated with a process context, the context-based module 128 may generate and apply contextual tags to specific text in the user interface 160*b* at 316. The contextual tags may be data structures that contain relevant information associated with particular words or other user interface elements in the specific context in which the word appears in the user interface 160*b*. The information contained in the contextual tags may be links to external sources for more information that may benefit the user, relevant information identified from automated or previous search results, links to other applications for performing auxiliary tasks in connection with the current business process, or other types of contextual links or data that the user may find beneficial to a particular business process. For example, the contextual tags may be activated through a user interface action performed by the user, which results in a display of details associated with the word or element marked by a contextual tag. Thus, the user is made aware of the additional information available that is associated with the tagged word. In general, particular words in the user interface 160*b*, including static text and data field entries, are selected based on their relation to other text in the user interface 160*b* and on their potential for generating substantial context-based suggestions. Contextual tags are then generated or updated for the selected words as described in further detail below in connection with FIG. 5.

Providing a context-based environment for data entry, searching, and navigation in a user interface may be beneficial in various scenarios. For example, context-based searching and navigation may help a user complete and submit a leave request. In some implementations, the user may be an employee and wish to submit the leave request through an application 144, which may require the user to enter relevant information before submitting the request. Each leave request instance may be associated with a particular data object with predefined elements or values that are known to be generally required for submission of a leave request. In other words, the leave request data object may represent a process context 126 of a leave request with a particular structure and particular values. In certain implementations, the structure and value of the process context 126 are variables of "business object types" or CCTS types. Accordingly, when a particular instance of a leave request business process is initiated by a user for processing by the application 144, the process engine 104 may recognize the process instance as a leave request if certain values common to leave requests and included in the leave request process context 126 are identified. The process context 126 of a particular process instance may be used by the context-based module 128 to facilitate the user's completion of the process instance.

For example, as depicted in FIG. 4, each leave request process context 400 may be associated with information including an ID of the employee (employeeID) 402a submitting the leave request, the name of the employee 404a, the ID of the approver of the leave request 414a, and other information associated with submission of the leave request. In certain implementations, some of the information in the leave request process context 400 may already be known. As illustrated in FIG. 4, for example, the leave request process context 400 already includes the employee identification number of the user submitting the leave request, "d055555" 402c. Other information may already be included in the leave request process context 400, such as the type of leave requested 406c and the employee's name 404c. In any event, when the context-based module 128 recognizes that the process instance initiated by the user is a leave request process from the process context 400, additional searches can be performed to determine possible values for the remaining variables in the leave request.

FIG. 5 depicts an example screenshot 500 of a user interface for submission of a leave request 502 as described in the present example. As illustrated in FIG. 5, the leave request user interface 502 may include various data fields 510 for an employee to enter information required for submission of a leave request. The data fields 510a-e may include a data field 510d for the user to input an appropriate approver for approving the user's leave request as well as a data field 510e for the user to enter appropriate notes regarding the leave request. The user interface 502 provided by the application, however, may not be directly associated with the leave request process context 400. In particular, the data fields 510 in the user interface may not be linked to their corresponding variables in the leave request data object 400 depicted in FIG. 4 until they are bound through an application or process such as, for example, a widget provided by the process engine 104. To bind user interface elements with elements in the process context 400, the widget may be programmed to automatically detect logical similarities between user interface data fields 510 and values in a related process context 400. The widget may also store information regarding previous bindings between the user interface and the process context for future use. In some implementations, the widget may incorporate a current state of the process context with the type of values bound in the process context to automatically offer help functions or search for relevant values. For example, the automatic suggestions provided by the context module 128 may depend on the particular step of the business process currently being executed as determined by the widget. The sequential progression of the business process may change the state of the process context associated with the business process, and the widget may accordingly track the state of the process context for generating suggestions or actions appropriate to the current state of the process context.

Once the data fields 510 in the user interface are bound or linked to the appropriate variables 402-414 in the process context 400 of the leave request, the context-based module 128 recognizes that, as shown in FIG. 4, the user will need to find an appropriate approver to submit the leave request to for approval. Various data objects associated with one or more of the variables in the process context 400 may be stored in a database 184 in the back-end system 124. The context-based module 128 can invoke a full-text search function 182 provided by the back-end system 124 to search the database 184 for relevant data objects that may provide information for identifying possible approvers for the leave request. For example, in some implementations, the employeeID 402c of the user may be used to search for an organizational chart associated with the user to obtain a list of the user's supervisors since an employee's supervisors may likely be appropriate approvers for leave requests. Further, the context-based module 128 can use the actual value of a variable as well as the variable type to search for relevant information in the back-end repository 184 since the variable type may include semantic information reflecting the additional relationships inherent to the variable. Accordingly, the actual value of the employeeID 402c as well as the variable type of the employeeID (userID 402b) may be used to search the database 184 for additional information. Given a list of the user's supervisors, which may be arranged in a hierarchy specific to a business organization, particular supervisors may be selected as suggested approvers for the leave request and presented to the user in a drop-down menu associated with the approver data field 512, as depicted in FIG. 5, for example. The suggested supervisors may be selected based on how directly related the supervisor may be to the user within the business organization or based on other criteria for listing the suggested entries in an order reflecting a likelihood that the user will select a particular supervisor as an approver. Additional suggestions for possible approvers may be identified based on, for example, other managers within the same department of the user. In the illustrated example, a list 512 of supervisors and their respective employeeIDs are presented to the user as suggested entries for populating the approver data field 510d as seen in FIG. 5.

In addition to identifying suggested entries for particular data fields 510 in the user interface, the context-based module 128 may also apply contextual tags to selected text displayed in the user interface for suggested searching, navigation, or action items associated with the selected text. The user interface may include certain text entered by a user in a data field or displayed text within the user interface. In some implementations, the context-based module 128 can scan the user interface and select, or highlight, semantically rich text for further processing and tagging. For example, the context-based module 128 may determine important logical connections between certain text and corresponding variables in the relevant business process context 126.

As illustrated in FIG. 5, three words in the user interface have been highlighted by the context-based environment: "d023588" 520*a*, "Reiner" 520*b*, and "Harald" 520*c*. In some implementations, words in the user interface are selected for highlighting based on the type of data in particular data fields. For example, the "d023588" text 520*a* may be recognized by the context-based module 128 as a standard employeeID of an employee and is accordingly highlighted so that additional data and links may be presented for the employeeID. Further, a text search of the database 184 in the back-end system 124 using "d023588" 520*a* as a search term may identify a full name, "Reiner Hille," associated with the "d023588" employeeID. In other words, the search results obtained from the automatic searching functionality 182 invoked by the context-based module 128 can be used for highlighting text for contextual tags. Since "Reiner" 520*b* is a word that appears in another data field in the user interface, it is also highlighted. Finally, the employee associated with the particular leave request may have a first name of "Harald," and the "Harald" text 520*c* is accordingly highlighted as well.

The highlighted text can be processed to determine a context associated with each highlighted word, and, if appropriate, contextual tags are applied so that additional information or suggested action items associated with the highlighted text may be presented to the user in a drop-down menu 530, for example. A word list 152 can be used to facilitate highlighting of text and generation of contextual tags. The word list 152 includes related words that are known to provide additional information with respect to a particular process context. In certain situations, a word list 152 may have been previously generated, and a word found in the word list 152 may be selected for highlighting, or a context of the highlighted word may be determined from the word list. If a word list 152 has not been previously generated, a word list 152 may be created and populated with highlighted words. In other situations, the context of a highlighted word may be determined based on the word's relation to other items in the user interface such as data fields or other text. For example, in the illustrated embodiment, the context-based module 128 may determine that "Reiner" is an employee name or the name of a potential approver based on the inclusion of "Reiner" 520*b* in the salutation of a message entered into a data field 510*e*. Additionally, other highlighted text such as "d023588" 520*a* may be identified as being an employeeID of an approver based on its presence in an approver data field 510*d*, and after a search in the back-end repository 184, the employeeID 520*a* is linked with its corresponding employee name Reiner. Once it is determined that the name of a possible approver may be displayed within the data field, information 530 derived from the context of the highlighted name of the approver may be presented. The information may include suggested action items for the user, such as showing a profile of the highlighted approver, showing the highlighted approver in an organizational chart, opening Harald's vacation calendar, showing additional information associated with the approver, listing additional alternative approvers, or other action items associated with the identified approver and the relevant context.

The contextual tags can be linked with search results from context-based searching performed with respect to data fields in the user interface. In other words, known information obtained from the context-based module 128 about a particular business process or user can be used to enhance or update the contextual tags. In particular, context-based module 128 can implement a learning mechanism that maintains a history or database of statistical information related to a particular business process. The statistical data is updated based on user activity associated with suggestions presented by the context-based module 128. For example, when the context-based module 128 does not have knowledge of a particular user's prior activity associated with a particular business process, the context-based module 128 may generate suggestions or contextual tags to the user based on internal logic that "guesses" the suggestions, links, and action items that are most likely to be selected by the particular user. The user's actions, such as the user's selection or avoidance of certain suggested entries or links, are then traced by the learning mechanism and stored in a history associated with the user and the particular process context. The previous actions of the user can then be used to refine or improve future suggestions to the user. Thus, context-based module 128 can generate contextual tags or suggested entries for data fields based on internal logic associated with a particular process context as well as a history of the user's previous actions associated with the process context. In some implementations, the statistical data gathered for a process context may be a history specific to a particular user or a general history of usage patterns across a plurality of users.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
identifying a process context associated with a business process, wherein the process context is represented by a process context data object including at least one variable representing values relevant to the business process, and wherein the at least one variable is linked to at least one data field displayed in a user interface;
determining the variable type of each variable of the at least one variable in the process context data object, wherein the determined variable type includes inherent semantic information reflecting the meaning of the variable or logical relationships associated with the variable;
selecting a particular variable of the at least one variable in the process context data object to use for searching a back-end repository for additional information associated with the business process;
dynamically determining, by operation of a computer, a suggested entry for the at least one data field in the user interface based on at least search results obtained from the search; and
presenting the suggested entry to a user through the user interface.

2. The computer-implemented method of claim 1, wherein the process context data object is identified based on at least one of the business process, a user profile of the user, at least one user activity of the user, data entered by the user, or static text presented in the user interface.

3. The computer-implemented method of claim 1, wherein selecting the particular process context data object variable is based on a determination of a logical connection between the particular process context data object variable and the data field in the user interface.

4. The computer-implemented method of claim 1, wherein the particular variable is selected based upon at least one of the type of the variable, a value in the variable, the relative importance of the variable in the business process, or the likelihood that a user will need guidance for particular steps in the business process.

5. The computer-implemented method of claim 4, wherein selecting a value in the variable is based on the inherent semantic information associated with the variable type.

6. The computer-implemented method of claim 1, wherein search results include an object graph depicting logical connections between data objects and the at least one variable associated with the particular process context data object.

7. The computer-implemented method of claim 6, wherein the suggested entry is determined based at least in part on the object graph.

8. The computer-implemented method of claim 1, further comprising applying a contextual tag to at least one selected word in the user interface, the contextual tag comprising a data structure that contains relevant information associated with the at least one selected word.

9. The computer-implemented method of claim 8, wherein the contextual tag includes at least a suggested option for performing an auxiliary task associated with the business process.

10. The computer-implemented method of claim 1 further comprising maintaining historical data associated with previously presented suggested entries associated with the user or the business process.

11. The computer-implemented method of claim 10, wherein the suggested entry is determined at least in part on the historical data associated with previously presented suggested entries.

12. The computer-implemented method of claim 10, wherein the historical data associated with previously presented suggested entries is updated after receiving a selection from the user for the suggested entry.

13. The computer-implemented method of claim 1, wherein the suggested entry is further based on a predefined word list of terms relevant to the business process.

14. A computer-program product encoded on a tangible, non-transitory storage medium, the product comprising computer-readable instructions for causing one or more processors to perform operations to:
identify a process context associated with a business process, wherein the process context is represented by a process context data object including at least one variable representing values relevant to the business process, and wherein the at least one variable is linked to at least one data field displayed in a user interface;
determine the variable type of each variable of the at least one variable in the process context data object, wherein the determined variable type includes inherent semantic information reflecting the meaning of the variable or logical relationships associated with the variable;
select a particular variable of the at least one variable in the process context data object to use for searching a back-end repository for additional information associated with the business process;
dynamically determine a suggested entry for the at least one data field in the user interface based on at least search results obtained from the search; and
present the suggested entry to a user through the user interface.

15. The computer-program product of claim 14, wherein the process context data object is identified based on at least one of the business process, a user profile of the user, at least one user activity of the user, data entered by the user, or static text presented in the user interface.

16. The computer-program product of claim 14, wherein selecting the particular process context data object variable is based on a determination of a logical connection between the particular process context data object variable and the data field in the user interface.

17. The computer-program product of claim 14, wherein the particular variable is selected based upon at least one of the type of the variable, a value in the variable, the relative importance of the variable in the business process, or the likelihood that a user will need guidance for particular steps in the business process.

18. The computer-program product of claim 17, wherein selecting a value in the variable is based on the inherent semantic information associated with the variable type.

19. The computer-program product of claim 14, wherein search results include an object graph depicting logical connections between data objects and the at least one variable associated with the particular process context data object.

20. The computer-program product of claim 19, wherein the suggested entry is determined based at least in part on the object graph.

21. The computer-program product of claim 14, further comprising applying a contextual tag to at least one selected word in the user interface, the contextual tag comprising a data structure that contains relevant information associated with the at least one selected word.

22. A system, comprising:
memory operable to store information associated with a context of a business process; and
one or more processors operable to:
identify a process context associated with a business process, wherein the process context is represented by a process context data object including at least one variable representing values relevant to the business process, and wherein the at least one variable is linked to at least one data field displayed in a user interface;
determine the variable type of each variable of the at least one variable in the process context data object, wherein the determined variable type includes inherent semantic information reflecting the meaning of the variable or logical relationships associated with the variable;
select a particular variable of the at least one variable in the process context data object to use for searching a back-end repository for additional information associated with the business process;
dynamically determine a suggested entry for the at least one data field in the user interface based on at least search results obtained from the search; and
present the suggested entry to a user through the user interface.

* * * * *